United States Patent [19]

Kawasaki et al.

[11] 4,423,506
[45] Dec. 27, 1983

[54] WIRE DATA TRANSMISSION SYSTEM

[75] Inventors: Kikuo Kawasaki; Tomomi Sano; Kazuo Yoshida, all of Kawasaki, Japan

[73] Assignee: Fuji Electric Co., Ltd., Kanagawa, Japan

[21] Appl. No.: 253,838

[22] Filed: Apr. 29, 1981

[30] Foreign Application Priority Data

Aug. 29, 1979 [JP] Japan .................. 54-109019

[51] Int. Cl.³ .................. H04J 3/02; H04L 25/02
[52] U.S. Cl. .................. 370/85; 375/36; 340/825.52
[58] Field of Search .................. 370/85, 90, 92, 13, 370/14; 375/36; 340/825.52, 825.63, 825.21, 825.08, 825.07

[56] References Cited

U.S. PATENT DOCUMENTS

| | | | |
|---|---|---|---|
| 3,497,619 | 2/1970 | Babcock | 375/36 |
| 3,671,671 | 6/1972 | Watanabe | 375/36 |
| 4,024,501 | 5/1977 | Herring et al. | 370/85 |
| 4,139,737 | 2/1979 | Shimada et al. | 370/85 |
| 4,155,075 | 5/1979 | Weckenmann | 340/825.07 |

FOREIGN PATENT DOCUMENTS 51-118903 10/1976 Japan .
54-109341 8/1979 Japan .

*Primary Examiner*—Douglas W. Olms

*Attorney, Agent, or Firm*—Stevens, Davis, Miller & Mosher

[57] ABSTRACT

In a wire data transmission system which transmits data from a master station to a number of slave stations or vice versa through a pair of signal wires connected in parallel with each other, only the master station need be provided with a data transmission power source. Signal lines receiving DC voltage from the power source through a resistor are periodically short-circuited within the master station, thereby to transmit "1" or "0" encoded data according to the duration of the short-circuiting time of the signal lines, along with an identification code which designates a slave station. In the slave station, a variation of a voltage between the signal lines is detected, so that the slave station receives the identification code and encoded data from the master station, and a state of short circuit between lines corresponding to encoded data or a clock pulse from the master station is changed by short-circuiting the signal lines, so that the slave station transmits the encoded data to the master station. The master station detects the change of the code transmitted therefrom to receive the encoded data from the slave station. When a short circuit fault occurs between the lines in the number of slave station equipments connected in parallel to the pair of signal lines, the slave station in which the short circuit fault has occurred is automatically isolated from the pair of signal lines.

11 Claims, 15 Drawing Figures

WIRE DATA TRANSMISSION SYSTEM

DESCRIPTION

TECHNICAL FIELD

The present invention relates to a wire data transmission system which transmits data from a master station to a plurality of slave stations located within a comparatively short distance in the order of several kilometers from the master station, through signal wires connected therebetween, and more particularly to a wire data transmission system wherein a circuit equipment in the respective slave stations has no power source, for the simplicity in circuit arrangement, and the respective slave stations achieve transmission and reception of data, with an excellent noise durability and with a high reliability.

BACKGROUND ART

Where it is desired to transmit data from a master station to a number of slave stations located within a comparatively short distance in the order of several kilometers from the master station, through a pair of signal lines connected therebetween, for example, as in a vending system of a hotel or the like, in which data of sold articles are transmitted from automatic vending machines equipped in guest rooms to a control unit in the hotel front through signal lines connected therebetween, it is required that each slave station has a data transmission device simple in structure, and transmits and receives data to and from the master station with a high reliability, independently of an external noise and without breaking or losing data, in the event of a power failure, thus ensuring the minimum data transmission function, irrespective of any accident.

On the other hand, a variety of highly reliable data transmission systems have hitherto been proposed. For example, a frequency modulation type data transmission system is known as being highly stable against an external noise. Such a frequency modulation type data transmission system, however, requires complicated circuit arrangement, incuring an increased manufacturing cost. From the economical viewpoint, the frequency modulation type data transmission system failed to find applications to a small scale, data transmission system, such as a hotel vending system described above. In general, for a small scale data transmission system such as a hotel vending system, in which only a small amount of data are transmitted at a comparatively low transmission rate, it is essential and important that circuit arrangements are less costly and easy to install, but perform transmission of data without decreasing reliability.

It is usual, in a wire data transmission system, to set an impedance at a receiving terminal at a high level, in order to avoid an adverse influence due to the lowered impedance in transmission lines. The transmission system having such a high impedance, however, is disadvantageously susceptible to an external noise, because a line voltage is likely to fluctuate even by a small noise energy. Furthermore, it is difficult, in the data transmission system having a high impedance, to exchange energy between the master station which is the center of the data transmission and a number of slave stations which are terminals of the data transmission with the result that in the event that a power source voltage in a certain slave station becomes zero due to a power failure, supply of a power source voltage from the master station to the slave station is interrupted, resulting in the failure of the transmitting and receiving functions in the slave station. With a view to maintaining the transmitting and receiving functions on the slave station side, irrespective of the loss of a power source voltage, an attempt has been proposed, for providing an interruption-free power source for the slave station incurring a greatly increased cost of equipment.

Since a signal line in the wire data transmission system extends over several kilometers, various surge voltages, such as a surge voltage due to lightning induction or a surge voltage due to induction from power supply wiring, tend to be introduced into the signal line. To cope with introduction of such surge voltages into the signal line, it is customary to interpose a surge-suppressing circuit element between the signal lines, as will be described later. The wire data transmission system of the type accordingly involves a risk that the surge-suppressing circuit element interposed between the signal lines remains short-circuited due to a surge voltage introduced into the signal lines, or the signal lines remain short-circuited due to the break of an output transistor in the master station or the break of a transmitting transistor in the slave station, with a likelihood of the impossibility of transmission of data. In order to remove the short circuit failure between signal lines, terminal circuit elements in the respective slave stations must be checked up to detect a point of failure. The checking-up of the terminal circuit elements in the respective slave stations in the wire data transmission system requires much labor and is greatly time-consuming, particularly in a vending system of a hotel, because signal lines are embedded in the walls of the building, a number of slave stations are distributed in guest rooms, respectively, and terminal circuit elements in an individual slave station must be electrically separated, for checking-up, from the signal lines sequentially. With the conventional wire data transmission system of the type, there has been a drawback in that the immediate removal of the short circuit failure between the signal lines for the assurance of the reliability in performance has been difficult. Another drawback encountered with the prior art wire data transmission system is that the wiring for laying out a pair of transmission lines in the wall of a building must be conducted with the possibly deepest care so that the polarities of these transmission lines are located correctly with respect to a DC signal voltage, for example, in a manner that a polarity of one wire is discriminated from that of the other by color. Nevertheless, the conventional wire data transmission system has occasionally suffered from accidents due to miswiring. In the case where diametrically small transmission lines are used for transmission of data over a long distance, for the simplicity in circuit arrangement of the transmission system, an increased attenuation of information signals due to a transmission lines resistance is bound to result. To avoid this, the wiring operation must be performed, taking the lowering of a signal voltage into consideration, and at the same time, the operational conditions of signal receiving circuit equipments in the respective slave stations must be individually adjusted to meet the lowered signal voltage. Placement and maintenance, of such a transmission system are time-consuming and require much labor.

DISCLOSURE OF INVENTION

It is accordingly an object of the present invention to provide a wire data transmission system wherein a central master station and a number of slave stations are connected each other by a small number of signal lines, thereby increasing a signal transmitting power, for reduction of an undesired influence due to an external noise; and a signal transmitting power from the master station is partly utilized as a signal transmitting power from a slave station, so that the signal transmitting and receiving functions between the master station and the slave stations can be maintained, even if a power failure occurs in at least any of the slave stations.

It is another object of the present invention to provide a wire data transmission system with a self-checking function, wherein in the case of a short circuit failure between signal transmission lines, the checking-up of terminal circuit elements in the respective slave stations is automatically conducted, so that a point of failure can readily be detected, and the point of failure thus detected is instantly removed, so that the reliability in performance of the transmission system is ensured.

It is a further object of the present invention to provide a common double-line type wire data transmission system, wherein a circuit arrangement in the master station is made simple in arrangement, as well as a circuit arrangement in the slave station is greatly simplified without the provision of its transmitter, so that transmission of data from the slave station to the master station can be performed by utilizing the signal transmitted from the master station, and a signal current is caused to flow only in one direction through the signal lines, as well as there is obtained transmission information with a high quality which has a high level, irrespective of the resistance in the signal lines.

It is a still further object of the present invention to provide a wire data transmission system, wherein in the event of a failure in a circuit element connected between a pair of signal lines in the respective slave stations, an adverse influence due to occurance of the failure is limited to the slave station in which the failure has occured, so that the signal lines are always available for the data transmission.

It is a still further object of the present invention to provide a wire data transmission system, wherein the non-polarization of signal lines used for the double-line semi-multiplex wire transmission, in which a signal current flows in one direction alone through a signal line, is achieved, for ease of a wiring work as well as reduction of a wiring cost.

It is a still further object of the present invention to provide a wire data transmission system, wherein adjustment of the operational condition of a signal receiving circuit arrangement used for the double-line, semi-multiplex wire transmission in which a signal current flows in one direction alone through a signal line is not needed, irrespective of a transmitting signal level being lowered due to the resistance in the signal line, with the result of ease of installation and maintenance of the transmission system, and with the assurance of stable operation, irrespective of the conditions of installation or service, of the transmission system.

To attain these objects described above, according to the present invention, in a wire data transmission system, in which a master station and a plurality of slave stations are connected commonly by a pair of signal lines to exchange data between the master station and the respective slave stations, the master station alone is equipped with a data transmitting power source and in the master station, the pair of signal lines receiving a voltage from the power source through a resistor are short-circuited at a predetermined period to transmit data from the master station to the respective slave stations, while in the respective slave stations, the pair of signal lines are short-circuited to change a condition of short circuit between lines corresponding the data from the master station, thereby transmitting data from the slave station to the master station.

Further, in a wire data transmission system according to the present invention, it is preferable that a plurality of slave stations are connected commonly to the master station by the pair of signal lines, a DC voltage is applied from the power source through a resistor to the pair of signal lines, the pair of signal lines are short-circuited at a predetermined period in the master station to transmit encoded data according to a time duration that the signal lines are short-circuited, and in the slave station, a change of a DC voltage developed across a resistor connected between the pair of signal lines is detected to receive the data from the master station.

According to the present invention, it is also preferable that in a wire data transmission system in which switching elements interposed between the signal lines respectively in the master station and the plurality of slave stations are driven to short-circuit the pair of signal lines in accordance with the data to transmit coded data, the respective slave stations, have switching means in series with circuit portions associated with the switching element for selectively short-circuiting the pair of signal lines, so that when the pair of signal lines are maintained short-circuited over a predetermined time duration, the switching means in the respective slave stations are once rendered opened, and then the switching means in these slave stations are sequentially rendered closed under the control of the master station, thereby detecting a short circuit failure between the signal lines in the circuit portion associated with the switching element.

Furthermore, it is preferable that when the master station calls one slave station so that data is transmitted from the slave station to the master station, the master station transmits continuously a clock pulse consisting of a periodically repeated pulse train having predetermined mark signals are predetermined space signals through the pair of the signal lines to the slave station after the calling pulse has been transmitted, then in the called slave station, the mark signal or the space signal in the clock pulse is converted into a space signal or a mark signal according to the data to be transmitted to the master station, and the master station detects the change of the mark signal or space signal in the received clock pulse train to receive the transmission data from the slave station.

In the present invention, the respective slave stations preferably comprise means for sensing whether or not a failure has occured in its own station, and means for interrupting a connection between the signal lines in the slave station when a failure has occured.

It is also preferable in the present invention that the respective slave stations comprise a balancing bridge circuit, so that the data is exchanged between the pair of the signal lines and the slave station through the balancing bridge circuit, so that the signal lines and the slave station are connected with a non-polarized manner.

Furthermore, in the present invention, it is preferable that the slave station comprises a reference level generating means for rectifying and smoothing the clock pulse received through the signal lines to generate a reference level by the rectified and smoothed output and a comparison means for comparing the level of the clock pulse received through the signal lines with the aforesaid reference level to identify a signal.

BEST MODE FOR CARRYING OUT THE INVENTION

The present invention will be explained in detail with respect to embodiments with reference to the accompanied drawings.

Figure 1:
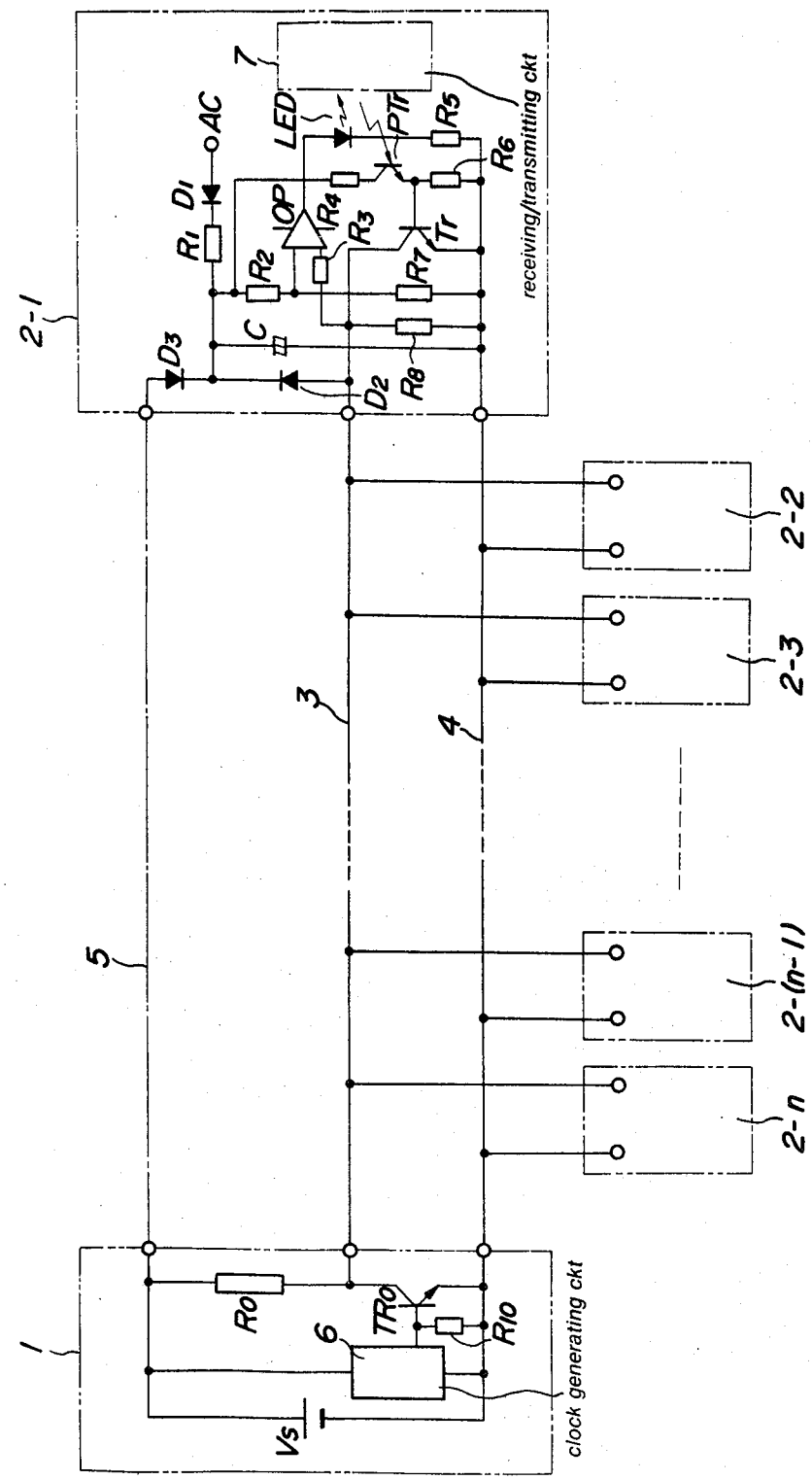
FIG. 1 is a circuit diagram showing a basic arrangement of a wire data transmission system according to the present invention.

FIG. 1 shows an embodiment of a basic arrangement of a wire data transmission system according to the present invention. Here, reference numeral 1 designates a master station 1 which controls the overall wire data transmission system, 2-1, 2-2, ..., 2-n are a plurality of slave stations as terminal stations to be controlled, 3 and 4 a pair of signal lines connecting the master station 1 in common to the n slave stations 2-1, 2-2, ..., 2-n, and 5 a power source auxiliary line 5. The master station 1 has a clock generator circuit 6, an output clock pulse of which is amplified by an output amplifier consisting of an output transistor $TR_0$ and resistors $R_0$ and $R_{10}$, and then transmitted to the pair of the signal lines 3 and 4. $V_s$ is a master station power source. All the slave stations 2-1 through 2-n are arranged in the same fashion. For example, the slave station 2-1 includes a receiving transmitting circuit 7, a light emitting element, such as a light emitting diode LED, and a light receiving element, such as a phototransistor PTr, both of which transfer signals from the signal lines 3 and 4 to the receiving transmitting circuit 7 and vice versa, an output transistor Tr for amplifying the signal from the phototransistor PTr, and an operational amplifier OP for sensing an incoming signal from the signal lines 3 and 4. In the slave station 2-1, R1 through R8 are resistors, C a capacitor, $D_1$ through $D_3$ diodes, and AC an AC power source terminal.

The number n of the slave stations 2-1, 2-2, ... 2-n may be increased to the utmost limit at which the transmission and reception of data becomes impossible because of the resistance in the signal lines 3 and 4. Usually, it is easy to determine the number n in the order of 100 stations. However, the increase in the number of the slave stations results in the increase of fall of a signal level produced by a resistance of the signal line due to a signal current flowing through a terminal resistor R8 in the slave station 2. Consequently, the master station fails to sense the conduction state of a transistor Tr for transmitting a signal in slave stations remote from the master station, resulting in a difficulty of the transmission of data from these slave stations, as will be described later. Furthermore, the reduction of a signal line voltage in these slave stations leads to the lowering of a charging voltage of the capacitor C which is charged through the diode D2 connected to the signal line by the signal line voltage, so that there is also a problem that it is difficult to detect data from the master station.

Figure 2:
FIG. 2 illustrates a waveform of data transmitting signals from the master station in the wire data transmission system of FIG. 1.

An example of a waveform of a data signal from the master station in a wire data transmission system according to the present invention is illustrated in FIG. 2. It is assumed that a DC voltage of 24 V is always applied from the DC power source $V_s$ through the resistor Ro to the signal line 3 in the circuit of FIG. 1. Under this condition, in order to transmit a data signal having the waveform illustrated in FIG. 2 from the master station 1 to a slave station, the output transistor TRo is repeatedly made conductive at a predetermined period by a control signal from the clock generator circuit 6, thereby short-circuiting the pair of the signal lines 3 and 4. The data signal transmitted according to a system of the present invention is a binary signal, represented by "1", "0" "H", "L" as in FIG. 2. The binary data signal is represented as "H" for the case where the output transistor TRo remains conductive for a long duration, and as "L" for the case where the output transistor TRo remains conductive only for a short period. The data signals are transmitted from the master station 1 to all of the slave stations 2-1 through 2-n simultaneously. In the slave station receiving the data signals, a terminal voltage across the terminal resistor R8 connected between the pair of the signal lines 3 and 4 is introduced through the resistor R3 into an operational amplifier OP, where the data signal waveform illustrated in FIG. 2 is detected as a difference between the terminal voltage and a fixed voltage level determined by the resistors R2 and R7. For example, the light emitting diode LED is lit when the signal lines 3 and 4 are short-circuited and the flashing state of the light emitting diode LED is transmitted in the form of light signal to the receiving/transmitting circuit 7, thus the data signal being introduced thereto. The receiving/transmitting circuit 7 may be formed, for example, of a microcomputer or the like and analyzes the received and converted data signal to discriminate whether or not an address of the data signal which designates a slave station coincides with the address of the designated slave station. If both addresses coincide with each other, the circuit senses the content of a subsequent data, for example, data transmission control information. The receiving/transmitting circuit 7, in addition to the reception of data, makes a preparation for transmitting data, which is to be responded to the data transmission control information from the master station 1. The types of data to be responded by the respective slave stations, although these types are various depending on applications of a wire data transmission system according to the present invention, are, for example, data of the number of sold articles retained in the refrigerator, contact information and operation information, in a case of a hotel vending system, or data of measurements in an automatic measuring system. A slave station designated by the master station 1, for example, the slave station 2-1, forms responsive data signals having waveforms illustrated in FIGS. 3(A) through (C).

Figure 3:
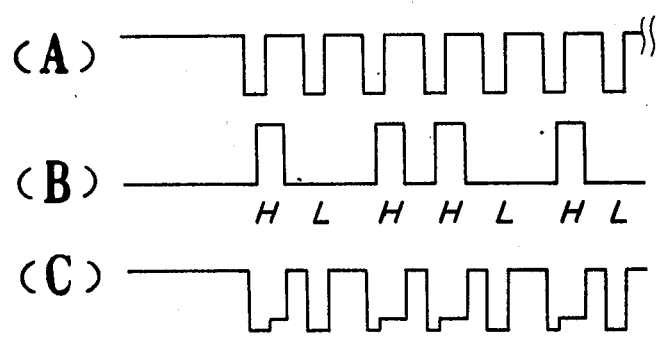
FIGS. 3(A), (B) and (C) illustrate the waveforms of signals, showing the process of the transmission of data from the slave station.

More specifically, the slave station 2-1 detects a train of clock pulses of a waveform illustrated in FIG. 3(A) transmitted from the master station 1 at a predetermined interval of time, following the aforesaid address signal. In synchronism with the clock pulse train, the slave station 2-1 forms a binary data signal, as illustrated in FIG. 3(B), which represents "H" or "L" in the form of the presence or absence of the pulses having a larger pulse width than that of the clock pulse, so as to transmit this responsive binary data signal to the master station 1. In other words, such the responsive binary data signal is supplied, via the light signal to the phototransistor PTr to control the conduction and interruption of the phototransistor PTr in a manner that the transmitting transistor Tr is conductive when the responsive data signal illustrated in FIG. 3(B) is at a high level to short-circuit the signal lines 3 and 4. The time duration of the short circuit between the signal lines for transmitting the data from the slave station 2-1 is so determined that the short-circuited condition is maintained for a given duration after the detection of the clock pulse from the master station 1, and the short circuit between the signal lines is released prior to the arrival of a subsequent clock pulse. If a short circuit between lines occurs in the mode described above in the slave station 2-1, the signal lines 3 and 4 remain short-circuited through the resistance of the signal lines, so far as the transmitting transistor Tr in the slave station 2-1 remains conductive, even if the output transistor TRo is interrupted, as illustrated in FIG. 3(C), in the master station 1 when the clock pulse train is transmitted. Consequently, a voltage between signal lines developed between the output terminals of the output transistor TRo in the master station 1 therefore can not completely restore the voltage between lines until the transmitting transistor Tr in the slave station 2-1 is also interrupted. Furthermore, the transmitting transistor Tr is not made conductive, if the responsive data signal from the slave station 2-1 is the L signal as illustrated in FIG. 3(B). Accordingly, at the time that the output transistor TRo is interrupted, the voltage between signal lines developed between the output terminals of the output transistor TRo restores its initial level. The master station 1 thus receives the responsive data signal from the slave station 2-1 by monitoring the relationship of a voltage between signal lines and the conduction or interruption of the output transistor TRo.

In this connection, only the slave station designated by the address signal from the master station 1 is allowed to transmit the responsive data signal. Whether the responsive data signal in response to the received address signal is to be transmitted or not is monitored and controlled by the receiving/transmitting circuits 7 in the respective slave stations 2-1 through 2-n. In order to ensure and facilitate the monitor and control by the receiving/transmitting circuits 7 in the respective slave stations 2-1 through 2-n, there is provided a given interval of time between the address designation and the control command signal from the master station 1 and the responsive transmitting clock pulse train from the slave station, so that a duration of a signal train defined by such a given interval of time, namely, a duration from the transmission of signal in the master station 1 until the reception subsequent to the transmission, is assumed as a unit data transmitting duration, and the data transmission according to a system of the present invention is repetitively performed by using the aforesaid duration of a signal train as a unit data transmitting duration. For example, in the hotel vending system, article sales data in the vending machines placed in the respective guest rooms are collected in succession. The respective slave stations 2-1 through 2-n, after receiving the signals transmitted from the master station 1, do not transmit the responsive data signal and keep waiting for reception, unless the slave stations receive a responsive data transmitting clock pulse train until the lapse of a given duration of time.

Next, explanation will be made with respect to supply of a circuit driving power source in the slave stations 2-1 through 2-n for receiving and transmitting data in the manner described above. The circuit arrangements in the respective slave stations are usually driven by a DC power source voltage obtained by rectifying a commercial AC power source from the terminal AC by the diode D1 and a drive power is usually supplied from the rectified DC power source to the receiving/transmitting circuit 7. In the event of a failure of the commercial AC power source, the chargeable cells are used for supplying a power to the circuits. To the signal circuit portions for receiving the signal transmitted from the master station 1 supplied is a driving voltage as a combination of a DC voltage obtained by charging and smoothing the DC voltage supplied to the signal line 3 from the master station 1 through the diode through the diode D2 in the capacitor C and a DC voltage obtained by rectifying the commercial AC power source voltage AC by the diode D1 and charged also in the capacitor C, as shown in FIG. 1. The reason why the drive power source for the receiving/transmitting circuit 7 and the drive power source for other signal circuit are separately provided, and a signal is transmitted in the form of the light signal for electrical insulation is to electrically separate the circuits so as to improve a noize durability of the receiving/transmitting circuit 7 for controlling the reception and transmission of data in the slave station, as well as to avoid an adverse influence resulting from grounding of the circuits. Since a built-in battery may be utilized as a drive power source in the receiving/transmitting circuit 7, it is possible that a negative voltage terminal of the signal line is connected as a ground potential of the receiving/transmitting circuit 7 thereto, while the electric potential of the whole of the receiving/transmitting circuit 7 is maintained in a floating state.

In this case, the ground potential in the receiving/transmitting circuit 7 formed of a microcomputer or the like fluctuates according to the variation of an electric potential in the signal lines to deteriorate the surge durability of the receiving/transmitting circuit 7. To avoid this, the receiving/transmitting circuit 7 must be strongly insulated from the signal lines. In other words, since the signal lines 3 and 4 extend over several kilometers, the signal lines are easily influenced by the induction or electric surge from a commercial power line, and therefore any countermeasure is required.

On the other hand, in the master station 1, the DC voltage of 24 V is always applied from the power source Vs through the resistor Ro to the pair of the signal lines 3 and 4, except in the case where tha pair of the signal lines are short-circuited for transmitting a data signal or a clock pulse. Therefore, the capacitor C in the slave station can be charged by the power source Vs in the master station, through the serial resistor R1 having a comparatively low resistance, the resistance in the signal lines and the diode D2 in the slave station, in this sequence. The capacitor C in the slave station is normally charged by rectifying the commercial AC power source voltage as set forth in the foregoing, and hence, a supply of a DC voltage from the signal lines is not needed. Here, a resistance value of the serial resistor Ro is set at a comparatively low value as described above to the effect that the capacitor C in a few slave stations can be charged by the power source Vs in the master station in case of a power failure on the slave station side, so that the transmission and reception of data in the overall data transmission system can be maintained, even if a power failure occurs in a few percent of slave stations simultaneously. In order to maintain the transmitting and receiving functions of the overall data transmission system in the event that a power failure occures in a large number of the slave stations simultaneously, the power source auxiliary line 5 is separately provided in parallel to the signal lines, so that power source Vs on the master station side always charges the capacitor C through the separate power source auxiliary line 5 and the diode D3 in the respective slave stations. In this case, the commercial AC power source equipment may be omitted in each slave station. Without the provision of the power source auxiliary line 5, the DC voltage between the signal lines is instantaneously and locally short-circuited by the output transistor TRo on the master station side or by the transmitting transistor Tr on the slave station side when the data signal is received or transmitted, and accordingly the capacitor C can be charged sufficiently in a smaller number of the slave stations.

Since the power source serial resistor Ro in the master station 1 is set at a comparatively low resistance value, as described above, if the serial resistor Ro has a resistance value that allows a current in the order of several tens to several hundreds milliamperes to flow when the output transistor TRo in the master station is rendered conductive, then an undesired voltage component, such as an external noise or a surge voltage, even if it is superposed on the signal lines 3 and 4, is removed by absorbing it through the serial resistor Ro into the power source Vs. At the time of the transmission of data that the pair of the signal lines 3 and 4 are short-circuited as a result of the conduction of the output transistor TRo in the master station or the transmitting transistor Tr in the slave station, the undesired voltage component, such as a noise or surge voltage superposed on the signal lines is terminated by the resistance of the signal lines, so that a level of the undesired voltage is made low. Consequently, the transmission of data can be achieved with a good signal to noise ratio.

Further, in the circuit arrangement shown in FIG. 1, the signal line current at the time of the data transmission is suppressed by the serial resistor Ro, so that a signal current value will be further reduced when data is transmitted from the master station 1 to a slave station remote from the master station 1. In order to relieve an adverse influence due to a reduced signal line current, a constant current circuit may be provided, instead of the power source serial resistor Ro. Use of the constant current circuit, however, incurs an increased cost of equipment. From the economical viewpoint, it is usual that such the constant current circuit is not connected to the signal lines.

Figure 4:
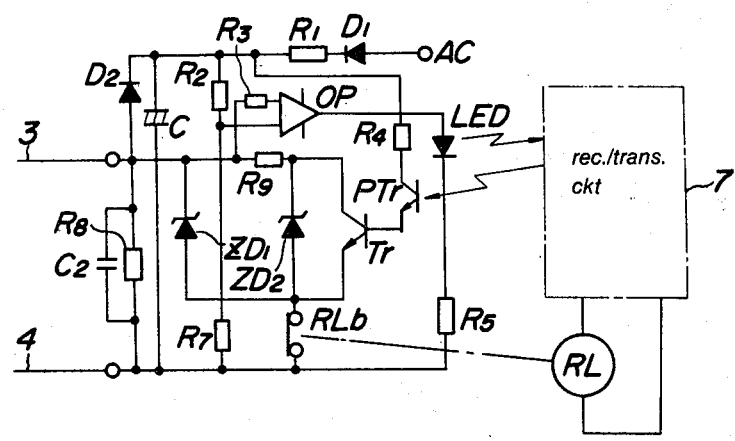
FIG. 4 is a circuit diagram showing in detail an embodiment of the slave station of the transmission system of FIG. 1.

The arrangement of the slave stations 2-1 through 2-n in the wire data transmission system according to the present invention shown in FIG. 1 is improved so that the slave station can automatically cope with a short circuit failure between the signal lines. The improved arrangement of one slave station is shown in FIG. 4. The arrangement of the slave station in FIG. 4 includes, in addition to the circuit elements shown in FIG. 1, a filter capacitor C2 connected in parallel with the signal resistor R8 as a surge voltage suppressing element to provide a time constant circuit between the pair of signal lines 3 and 4, Zener diodes ZD1 and ZD2 and a serial resistor R9. In the arrangement of FIG. 4, in order to separate the connection of the circuit elements connected between the signal lines, which might cause a short circuit failure between the signal lines 3 and 4, namely, the transmitting transistor Tr and the surge voltage suppressing Zener diode ZD1 from the signal lines, so as to facilitate the checking-up of these circuit elements, one terminals of the transmitting transistor Tr and the surge voltage suppressing Zener diode ZD1 are commonly connected via a relay contact RLb to the signal lines. A relay RL for making the relay contact RLb open or close is connected to the receiving/transmitting circuit 7, so that the relay RL is controlled by the circuit 7. The relay contact RLb is normally closed in the case of an ordinary data transmission, so that the data transmission from the slave station as well as suppressing of a surge voltage can function.

When the pair of the signal lines 3 and 4 are short-circuited to transmit the encoded data, or when the data transmission is stopped, as described above, if the short circuit of the pair of the signal lines is maintained over a given duration, for example, over 0.5 second, then it is deemed that a failure has occured in terminal circuit elements in any of the slave stations, and the relays RL are operated under the control of the receiving/transmitting circuits 7 in the respective slave stations to once open the relay contacts RLb in all of the slave stations. Under this condition, even if there is actually found a failure in a circuit element which caused the short circuit between the signal lines, the data transmission at least from the master station 1 is permitted, because the circuit element has been now electrically separated from the signal lines by the above described operation. Under the situation, the master station 1 designates addresses of the slave stations to sequentially close the relay contacts RLb in the slave stations 2-1 through 2-n. If there is a slave station in which a short circuit between the signal lines again occurs by the closure of the relay contact RLb, only the relay contact RLb in that slave station is opened, while the other slave stations restore the normal data transmitting state. In the slave station in which a failure has occurred, the normal operation is permitted, except that the data transmission from that slave station becomes impossible because of the opening of the relay contact, and consequently the failure in that slave station can be repaired for that duration. In a case that no failure is found by the sequential checking-up carried out according to the above-described command from the master station 1, or in a case that a predetermined duration, for example, 10 minutes, has been elapsed after the occurrence of a short circuit failure between the signal lines, then the short circuit failure between the signal lines is considered as a temporary failure of a terminal circuit element in either one of the slave stations, due to a surge voltage or the like, and the relay contact RLb in each slave station is automatically closed, so that each slave station resumes its normal state.

It is considered that, in the data transmission system shown in FIG. 1, only the surge suppressing Zener diodes ZD1 and ZD2 and the transmitting transistor Tr provided in each slave station shown in FIG. 4 have every likelihood of causing a short circuit failure between the signal lines, but other elements have the least possibility. If a fault occurs in any of Zener diode ZD1 or ZD2 or in the transmitting transistor Tr in any slave station, and such an element is always conductive, then the pair of the signal lines are kept short-circuited to interrupt the overall functions of the data transmission system. Under a condition that the relay contact RLb in that slave station in which a fault occurs is opened, the surge suppressing and data transmitting functions in that slave station alone are stopped, but the remaining functions in the data transmission system are performed as usual. Thus, the normal operation of the data transmission system is maintained while the relay contact RLb in that slave station remains opened for a duration that the fault is repaired. That data transmission in that slave station can be performed by temporarily using any suitable data transmission means.

Figure 5:
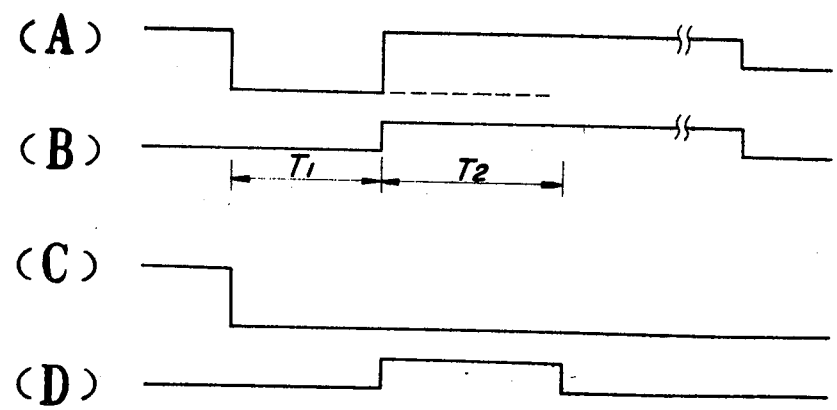
FIGS. 5(A), (B), (C) and (D) are timing charts showing the process of checking-up of a signal line failure.

The timing relationship of the waveforms of a voltage between the signal lines and the opening and closing conditions of the relay contact RLb is illustrated in FIGS. 5(A) through (D). Under the normal data transmission condition, the pair of the signal lines are intermittently short-circuited only for an extremely short period of time. In case of a failure in the terminal circuit element in any slave station, the pair of the signal lines are kept short-circuited for a markedly long duration T1, for example 0.5 second, as illustrated in FIG. 5(A). When this continued short circuit between the signal lines is sensed in the respective slave stations, the relay contacts RLb in the slave stations are automatically opened, as illustrated in FIG. 5(D). After the lapse of a predetermined duration T2, for example, 10 minutes, these relay contacts are automatically turned to the normal closing condition, as described in the foregoing. For that duration, the terminal circuit element in the slave station which has caused the short circuit failure between the signal lines is in the failure state from the initial instant of the duration $T_1$ as illustrated in FIG. 5(C) and only the relay contact RLb in the slave station in which the fault has occurred is maintained opened, even after the lapse of the duration T2, by the command from the master station, as illustrated in FIG. 5(B). When the relay contacts RLb in the respective slave stations are all opened, at least the short circuit between the signal lines is removed, so that the normal data transmission condition is resumed, as illustrated in FIG. 5(A).

If a short circuit failure between the signal lines yet exists, notwithstanding a failure in the terminal circuit element in any of the slave station is found, and only the relay contact RLb in the slave station is kept opened, then it is readily inferred that there exists a failure in any other terminal circuit element in any other slave station. Accordingly, the automatic checking-up in accordance with the transmission of addresses from the master station proceeds, and the procedures for finding a failure in the terminal circuit element and removing the failure are performed in a manner described above.

The master station, likewise the slave station, senses the continuous short-circuited state between the signal lines, and commands the automatic checking-up in response to the above-described sequential addressing, as a matter of course. In case a failure in a signal line is caused by other causes, such as a contact between the signal lines themselves, disconnection of line, a power failure or the like, then the above-described automatic checking-up process fails to detect a cause of failure, and hence the data transmission system does not resume its normal condition. Therefore, the detection of a cause of a failure in such a case must rely upon other countermeasures. Detection of a failure in the master station itself and the removal of the failure are comparatively easy. Further, the relay contact for electrically separating the terminal circuit element from the signal lines may be substituted for a semiconductor switch or the like with a high surge durability and a small probability of failure occurrence. When the relay is used, a monitoring function for avoiding a consumption of battery used in case of power failure in the commercial AC power source may be provided for the receiving/transmitting circuit 7 in each slave station.

The principle of a pulse width modulation type, common double line wire transmission system which is another mode of a wire data transmission system according to the present invention will be explained with reference to the waveforms of transmitting signals.

Figure 6:
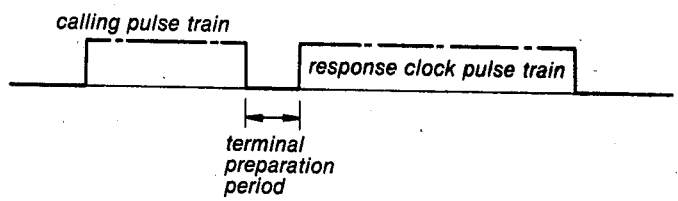
FIG. 6 diagrammatically illustrates the mode of transmission of signal from the master station.

When a data transmission system according to the present invention is used for the hotel vending system or the like, in which the hotel front sequentially calls the vending machines placed in guest rooms so as to collect the articles sales data, the master station placed at the front transmits to the signal lines a calling pulse train consisting of identification signals given to the respective slave stations in the guest rooms, as shown in FIG. 6, and the calling pulse train is received by the slave stations. After the lapse of a predetermined preparation period for transmitting information, such as articles sales data in the slave station designated by the identification signal, the master station transmits a clock pulse train consisting of a train of periodically repeated mark signals and space signals.

Figure 7:
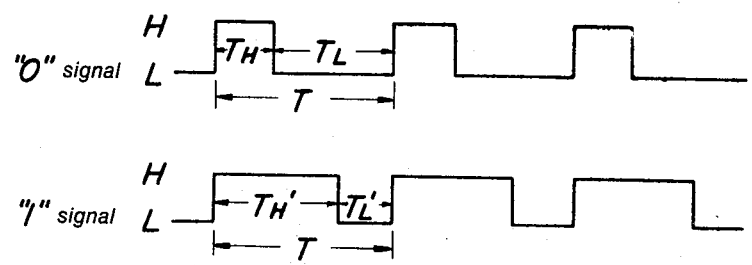
FIG. 7 illustrates basic waveforms of transmitted signals in FIG. 6.

Here, a clock pulse is a "0" or "1" signal having a predetermined repetitive period T, as illustrated in FIG. 7. The "0" signal consists of a mark signal having a short period $T_H$ and a space signal having a long period $T_L$. The "1" signal consists of a mark signal having a long period $T_H'$ and a space signal having a short period $T_L'$. It is assumed that the mark signal is representative of a high level H, and the space signal, a low level L. The clock pulse is formed by making a time length of a duration of a mark signal different from that of a duration of a space signal, for example, a duration ratio $T_H:T_L$ is 1:2 in the "0" signal, and a duration ratio $T_H':T_L'$ is 2:1 in the "1" signal, as seen in FIG. 7.

Figure 8:
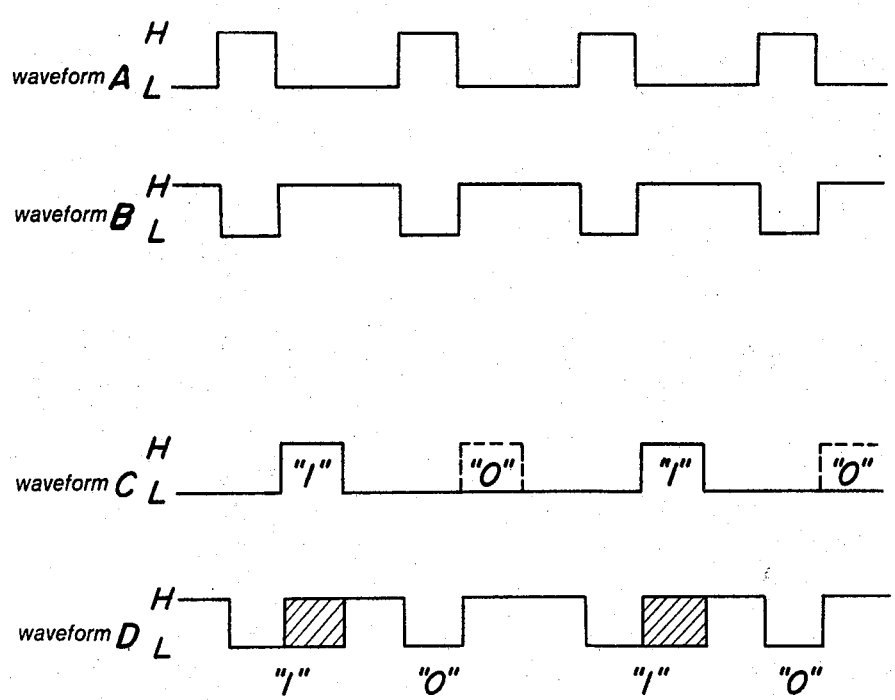
FIG. 8 illustrates waveforms of the mode of transmission of response signals from the slave station.

When transmitting information from the slave station to the master station, the master station supplies a clock pulse train consisting of "0" signals having a predetermined repetition period, as illustrated by a waveform A in FIG. 8, to an amplifier, which applies between the double-line type signal lines connected in common to the respective slave stations an inverted voltage pulse train as illustrated by a waveform B in FIG. 8. On the other hand, the slave station designated by an identification signal represented by a calling pulse train sequentially detects voltage pulses having the waveform B and developed between the double line type signal lines. Only when a code signal "1" alone is to be transmitted, as illustrated in a waveform C in FIG. 8, a pulse is applied to a switching element connected between the double line type signal lines to close the switching element, thereby short-circuiting the double line type signal lines. Consequently, the load resistance of the amplifier in the master station is grounded by way of the pair of the signal lines, and an inverted voltage pulse train as illustrated in the waveform B in FIG. 8 developed across the load resistor changes to a pulse train having the waveform D in FIG. 8, in which the voltage waveform is partly collapsed during the period that the signal lines are short-circuited by the slave station to extend a low level duration of the voltage waveform. By presence or absence of an extended low level duration corresponding to the clock pulse, the occurrence of the short circuit between the signal lines in the slave stations, i.e., presence or absence of "1" pulse illustrated by the waveform C, can be detected, and whether the information signals transmitted from the slave stations are "1" or "0" can be discriminated.

Figure 9:
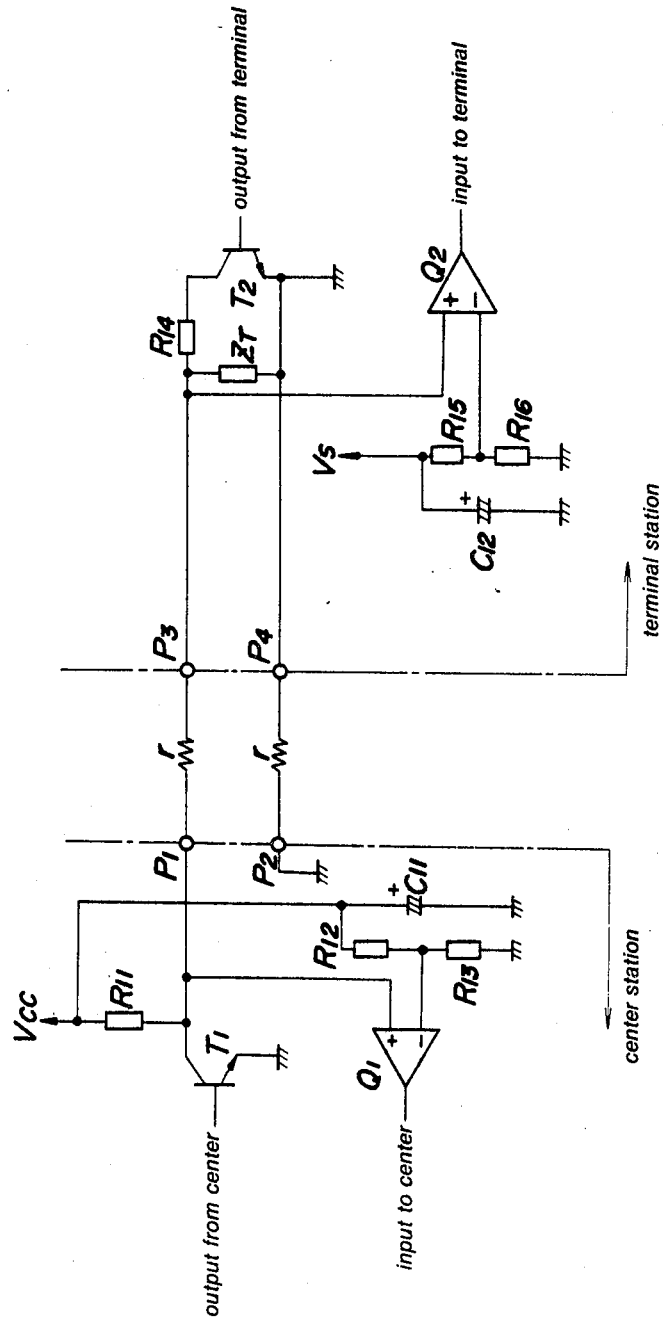
FIG. 9 is a circuit diagram showing another embodiment of a basic arrangement of a wire data transmission system according to the present invention.

A fundamental arrangement of a transmission system by which the above-described pulse width modulation signal can be transmitted is shown in FIG. 9.

In the wire data transmission system shown in FIG. 9, a circuit arrangement of the master station is connected to respective one terminals P1 and P2 of a pair of signal lines respectively having a resistance r, and a circuit arrangement of the slave station is connected to respective other terminals P3 and P4 of the pair of the signal lines. Practically, there are provided n slave stations which are connected in parallel to the pair of the signal lines. In the master station of the transmission system having the connection described above, the terminal P2 of one of the pair of the signal lines is grounded, and to the other terminal P1 thereof applied is a power source voltage Vcc through a load resistor R11 of a switching transistor T1. In the slave station, the terminal P4 of one of the pair of the signal lines is grounded, and a terminal resistor $Z_T$ is connected between the pair of the terminals P3 and P4. Accordingly, in an ordinary connection state, a current of $V_{cc}/[R11+(1/n)Z_T+2r]$ is allowed to flow through the pair of the signal lines. When the switching transistor T1 is interrupted, a voltage obtained by the following equation is applied to the terminal P1 on the master station side:

$$V_{P1\ OFF}=V_{cc}[2r+(1/n)Z_T]/[R11+(1/n)Z_T+2r]$$

and on the other hand, to the terminal P3 on the slave station side, a voltage obtained by the following equation is applied, when the switching transistor T1 is interrupted:

$$V_{P3\ OFF}=V_{cc}\cdot(1/n)Z_T/[R11+(1/n)Z_T+2r]$$

Since the current of the above-described value flows in the direction from the terminal P1 to the terminal P3 and in the direction from the terminal P4 to the terminal P2 through the signal lines, respectively, the following is always obtained: $V_{P1\ OFF}>V_{P3\ OFF}$. A small voltage of $V_{cc}\cdot r/[R11+(1/n)Z_T+2r]$ is applied to the grounded terminal P4 on the slave station side.

Under this situation, in case of transmitting a signal from the master station, if a clock pulse train having the waveform A in FIG. 8 is supplied to the base of the switching transistor T1, then a pulse train of the waveform B in which the polarity of the clock pulse train is inverted, is produced at the load resistor R11 and develops at the terminal P1. During the low level duration of the pulse train having the waveform B, the switching transistor T1 becomes conductive and all voltages at the respective terminals on the pair of the signal lines fall to zero, as expressed by:

$$V_{P1\ ON}=0,\ V_{P3\ ON}=0.$$

The pulse train having the waveform B and applied to the master station side terminal P1 of the signal line is received by the slave station side terminal P3, with a slight reduction of a voltage level due to the resistance r of the signal line, and is received by a slave station. Thus, in the slave station, the pulse waveform signal at the terminal P3 of the signal line is supplied to a comparator Q2, in which the signal is compared with a threshold level of a reference voltage, so that the slave station can receive the clock pulse train having the waveform A, or "1" or "0" of the coded signal, which is discriminated from each other in accordance with the time length of a high level duration and a low level duration, as shown in FIG. 7, is identified, so that the slave station can receive an information signal, such as a slave station identification signal.

The reference voltage to be applied to the comparator Q2 for the comparison of threshold level may be a DC voltage from a battery provided in the slave station or obtained by rectifying an AC power source voltage. The DC voltage is stabilized and smoothed by a capacitor C12, and the smoothed voltage is applied to a voltage divider consisting of resistors R15 and R16, so that there is provided a proper voltage level, such as an intermediate level, capable of clearly discriminating high and low voltage levels of the pulse train transmitted from the master station, and this voltage is applied to a comparison input terminal of the comparator Q2.

In order to transmit an information signal from the slave station to the master station, the terminal resistor $Z_T$ connected between the pair of the signal lines is short-circuited through a resistor R14 by a switching transistor T2 to transmit a code signal. More specifically, following the reception of the pulse train having the waveform B in FIG. 8, the code signal composed of "1" and "0", like the waveform C, which is indicative of information to be transmitted is applied to the base of the switching transistor T2 to render the switching transistor T2 conductive, so that the terminal resistor $Z_T$, namely, the pair of the signal lines, is short-circuited through the resistor R14 only when the code signal "1" is transmitted. By the short-circuit between the signal lines which corresponds to the code signal "1", a change in a voltage waveform, such as in the waveform D in FIG. 8, which is produced in the pulse train of the waveform B applied to the signal lines, is detected on the master station side, as described above and the transmitted code signals are received in the master station. In other words, a voltage applied to the terminal P1 when a signal of the pulse train having the waveform B is at a high level, $$V_{cc}[2r+(1/n)Z_T]/[R11+(1/n)Z_T+2r]$$

changes to a very low level as a result that the switching transistor T2 in the slave station becomes conductive, as follows:

$$V_{cc}[2r+R14//(1/n)Z_T]/[R11+2r+R4//(1/n)Z_T]$$

wherein $R14//(1/n)Z_T$ represents a parallel resistance value of a resistance value $(1/n)Z_T$ obtained by the parallel connection of the terminal resistors $Z_T$ of the signal lines in the respective slave stations and a resistance value R14 applied in parallel to the aforesaid resistance value as a result of the conduction of the switching transistor T2. Consequently, if the parallel resistor R14 is set at a sufficiently small resistance value and the terminal resistance value $(1/n)Z_T$ is set at a level sufficiently higher than the load resistance value R11 on the master station side, for example, $R4 \approx 0$, and $(1/n)Z_T = 5R11$, then a voltage level remarkably changes at the terminal P1 on the master station side to ensure the identification of "1" or "0" of code signals transmitted from the slave station. That is, if in the master station, a voltage waveform signal having the waveform D at the terminal P1 of the signal line is applied to the comparator Q1 and the comparison with the threshold level is made, a difference between the voltage waveforms B and D is clearly detected, so that "1" or "0" of the received code signal is discriminated.

The reference voltage to be applied to the comparator Q1 for the threshold level comparison described above is obtained in such a way that the power source voltage $V_{cc}$ obtained by rectifying the AC power source is smoothed by the capacitor C1, and the smoothed voltage is then introduced into the voltage divider consisting of the resistors R12 and R13 so as to divide to a level proper to the threshold level comparison. If a level of the reference voltage is set, for example, at 65% of the high level of the voltage having the waveform D to be compared, a sufficient allowance can be obtained, even if the high and low levels of the voltage waveform to be compared are fluctuated. For example, irrespective of a difference in length of the signal lines, namely, in case of a fluctuation in a signal voltage due to line resistance, an accurate threshold level comparison is ensured. As a result, even if a resistance of the signal line to be used is high because a diameter of the line is too small, the voltage divider having the resistors R15 and R16 for supplying the reference voltage to the comparator Q2 need not be provided in the respective slave stations separately, if both of the resistance values at the resistors R12 and R13 in the voltage divider for applying the reference voltage to the comparator Q1 and the resistance vlaue at the load resistor R11 of the switching transistor T1 are set at proper resistance values in conformity with the resistance of the signal line.

An embodiment of a detailed arrangement of the wire data transmission system basically arranged in the manner described above is shown in FIG. 10. In the wired transmission system shown in FIG. 10, the master station is provided with a "0" signal transmitter 11 and a "1" signal transmitter 12, which transmit signals "0" and "1" illustrated in FIG. 7, respectively. These signals constitute code signals "0" and "1" serving as identification signals in the respective slave stations, as the calling pulse train of the transmission signal from the master station illustrated in FIG. 6. The "0" signal per se can be used as a response clock pulse train in the transmission signal from the master station illustrated in FIG. 6, as is apparent by a comparison between the waveform in FIG. 7 and the waveform A of FIG. 8. 13 is a rise detector adapted to generate a high level output for a duration from an instant that a signal from the "0" signal transmitter 11 changes from a space signal to a mark signal to an instant that the mark signal thus changed returns to the space signal. 14 is a transmitting register adapted to output the stored data, while shifting it bit by bit at a timing of a signal applied from the rise detector 13 to a clock terminal CK. 15 is a receiving register for reading and shifting an input signal bit by bit at a timing of the signal from the rise detector 13 which is applied to the clock terminal CK to store the input signal in this register 15. The "0" signal and "1" signal from the transmitters 11 and 12 are applied to AND gates A1 and A2, respectively. By the transmitting code signal from the transmitting register 14 and the inversed signal through an inverter I1, the AND gates A2 and A1 are respectively controlled in correspondence to the "1" and "0" signals of the transmitting code signal. The "0" signal and the "1" signal which are combined in the order of the transmitting code signals are applied through an OR gate O1 to an AND gate A4. In accordance with a transmission command signal applied to the AND gate A4, the "0" and "1" signals are applied through an OR gate O2 to the base of the transmitting switching transistor T1 to drive the switching transistor T1 so as to short-circuit the terminals P1 or P2 of the double line type signal lines in accordance with the transmitting code. The "0" signal from the transmitter 11 for use in the transmission of the transmitting code signal is applied to the rise detector 13 to produce an in-station clock pulse having a proper pulse width, in accordance with the leading edge of the signal waveform. The in-station clock pulse in applied to the transmitting register 14 and the receiving register 15 both of which are formed by shift registers to control the reading of a transmitting code signal and the writing of a receiving code signal from a terminal station. The in-station clock pulse is further delayed properly through a delay circuit 19 to reset a preset counter 18 in a signal discriminating circuit 16, thereby resetting the counting operation for discriminating "0" from "1" in the received code signal, which will be described later. Furthermore, the "0" signal from the transmitter 11 is applied through an inverter I2 to an AND gate A5, as an inverted signal of a response clock pulse train.

On the other hand, the master station detects a change in a voltage waveform, such as shown in the waveform D of FIG. 8 which is formed at the terminal P1 of the signal line by the short-circuiting the double line signal lines in accordance with the response code signal like the waveform C of FIG. 8 in the slave station, in order to receive the response code signal from the slave station. For that purpose, the voltage waveform signal at the terminal P1 is applied to the comparator Q1 consisting of a feedback type differential amplifier with a resistor R17 in a level detector 20 to compare the signal with a threshold level of a reference voltage $V_T$, so that a high level duration in the waveform as the received code signal is clearly discriminated from a low level duration therein. The threshold level comparison output from the comparator Q1 is applied through a resistor R18 and an inverter I3 to the AND gate A5, so that the output is gated by the inverted signal of the above-described response clock pulse train to derive from the AND gate A5 a low level portion alone of the voltage waveform at the terminal P1 of the signal line, which is applied to the signal discriminating circuit 16. In the signal discriminating circuit 16, the low level portion of the received voltage waveform which is derived through the inverter I3 and the AND gate A5 is applied to an AND gate A6, so that a timing clock pulse from a clock transmitter 17 is allowed to pass through the AND gate A6 only for the low level duration. The timing clock pulse from the AND gate A6 is applied to the preset counter 18, so that a time length of the low level duration is counted. Only when the counting result of the low level duration exceeds a preset value suitable for discriminating a difference in time length between the low level durations representing "1" and "0" in the received code signal as shown in the waveform D in FIG. 8, a counter output signal indicative of the received code signal "1" is produced. The received code signal resulting from such the signal discrimination is written in a receiving register 26. Further, the preset counter 18 is reset at every time of the received code signal "1" or "0", as described above.

Further, when receiving the response code signal from the slave station, the "0" signal from the transmitter 11 is transmitted in advance as a response clock pulse train through the AND gate A3 and the OR gate O2 in accordance with the receiving command signal, as a matter of course.

Figure 10:
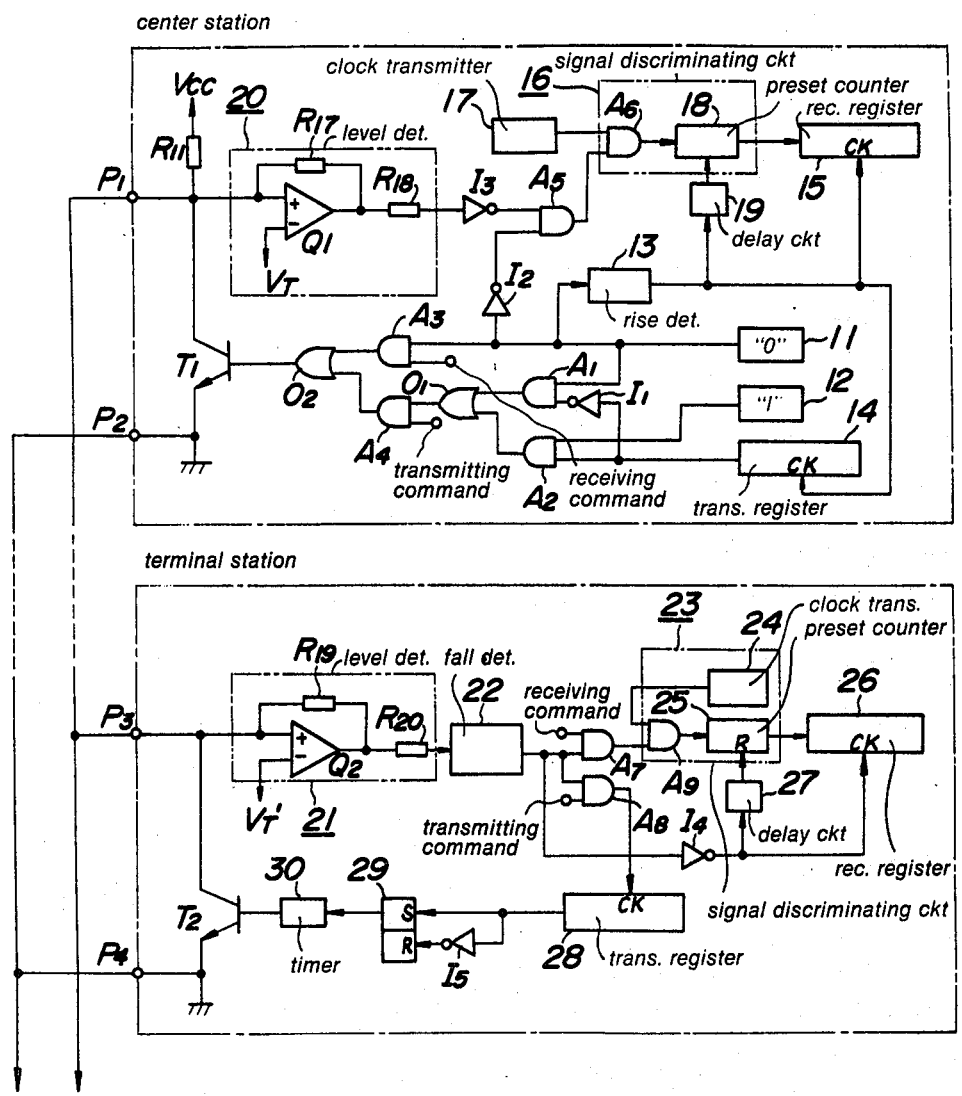
FIG. 10 is a block diagram showing an embodiment of a detailed construction of the transmission system of FIG. 9.

Next, in the slave station in the wire data transmission system shown in FIG. 10, a transmitting voltage waveform signal from the master station which develops at terminals P3 and P4 of the pair of the signal lines is applied to a level detector 21. In the level detector 21, the transmitting voltage waveform signal is supplied to a comparator Q2 consisting of a feedback type differential amplifier with a resistor R19, so that a threshold level comparison of the signal with the reference voltage $V_T'$ properly set in the manner described above is made to clearly discriminate a high level duration of the transmitting voltage waveform from a low level duration thereof. The threshold comparison output is supplied through a resistor R20 to a fall detecting circuit 22, which detects a low level duration in the inverted transmitting voltage waveform, as seen from the waveforms A and B in FIG. 8, namely, a high level duration of the original signal. The detection output signal is supplied via an AND gate A7 to a signal discriminating circuit 23 in accordance with a receiving command signal. In the signal discriminating circuit 23, a low level duration signal of the detection output signal is applied to an AND gate A9, and a timing clock pulse from a clock transmitter 24 is allowed to pass through the AND gate A9 to a preset counter 25, so that a time length of the low level duration in the transmitting voltage waveform, namely, a time length of a high level duration in the original transmitting code signal, is counted. Only when the result of the count exceeds a preset value preferable for discriminating a difference in time length between the low level durations representing "1" and "0" in the original transmitting code signal, as illustrated by the waveforms A and B in FIG. 7, a counter output signal representing "1" of the original transmitting code signal is produced. The received code signal obtained by the result of this signal discrimination is written in the receiving register 26 while shifting the received code signal bit by bit at a timing of the output from the fall detecting circuit 22. A fall detecting output pulse from the fall detecting circuit 22 is applied as a clock signal through an inverter I4 to the receiving register 26 in the form of a shift register, and is also applied to the preset counter 25 after the output pulse is delayed properly by a delay circuit 27, so that the preset counter 25 is reset at every time of "1" and "0" of the received code signal.

When the transmitting signal from the master station thus received by the slave station in the manner described above is the identification signal which designates the slave station in question, the fall detecting pulse with respect to a response clock pulse train subsequently transmitted from the master station after the lapse of a given duration of time from the reception of the identification signal is supplied from the fall detecting circuit 22 to the AND gate A8, and then, as a clock signal, to a transmitting register 28 in accordance with a transmitting command signal, thereby driving the transmitting register 28 consisting of a shift register, so that the code signal of information to be transmitted to the center station, for example, articles sales data of the vending machine, is read out while shifting the code signal bit by bit. The responsive code signal thus read out is directly applied as a set input to a flip-flop 29, and as a reset input thereto through an inverter I5. The output pulse from the flip-flop 29 is applied to a timer 30 to produce an output signal having a high level for a predetermined time duration, for example, a "1" signal having a proper time length as illustrated by the waveform C in FIG. 8, when the timer 30 receives the mark signal of a high level. The responsive code signal consisting of such the "1" signal is applied to the base of the switching transistor T2, thereby short-circuiting the double line type signal lines in response to the responsive code signal. In this manner the pulse width modulation type responsive signal, as described with reference to FIG. 8, is transmitted.

In practice, in order to avoid the occurrence of a failure due to a difference in DC potential between the signal lines and the master station equipment as well as the slave station equipments in the detailed circuit arrangement shown in FIG. 10, it is preferable that in the master station the level detector 20 and the inverter I3 are coupled by a photocoupler and the OR gate O2 and the switching transistor T1 are coupled by a photocoupler, that in the slave station, the level detector 21 and the fall detecting circuit 22 are coupled by a photocoupler and the timer 30 and the switching transistor T2 are coupled by a photocoupler, and that a voltage stabilizing circuit consisting of a resistor and a Zener diode is connected between the input terminals P3 and P4.

Figure 11:
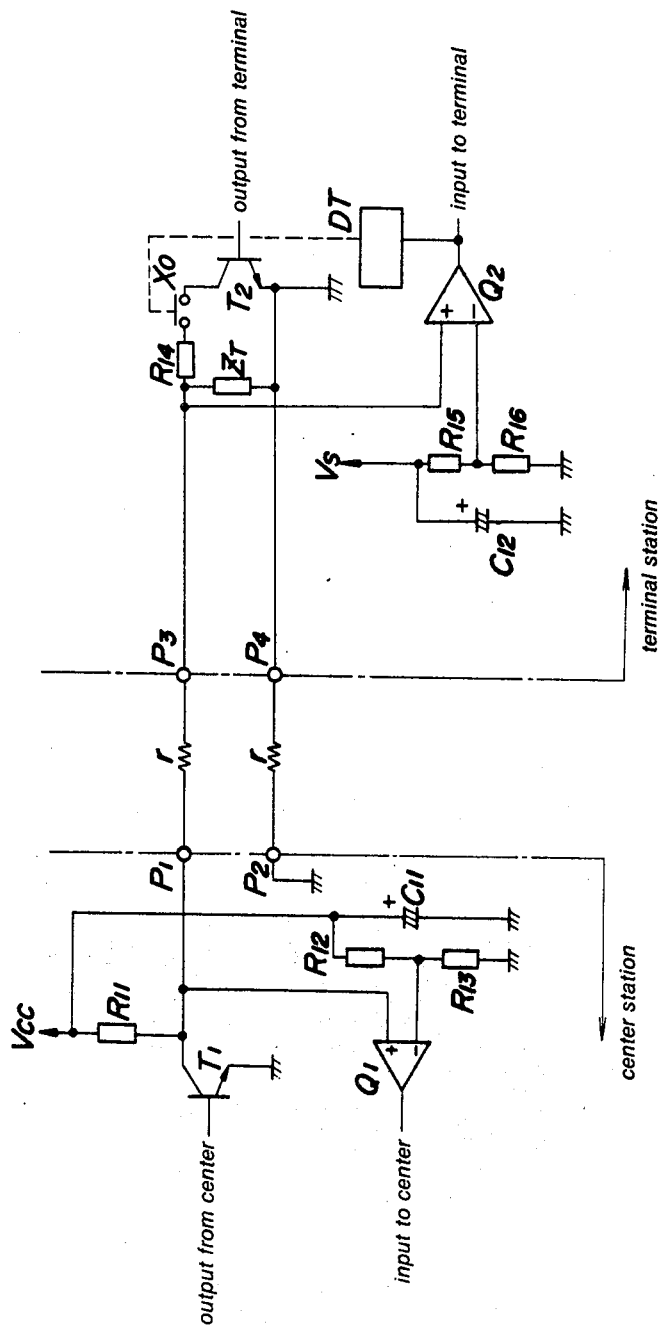
FIG. 11 is a circuit diagram, showing a further embodiment of a basic arrangement of a transmission system according to the present invention.

FIG. 11 shows a basic arrangement of a further embodiment in which a wire data transmission system for transmitting a pulse width modulation type signal, as described above, is improved in a manner that in the event of a failure in a certain slave station, an adverse influence due to the occurrence of the failure is limited to the slave station in question alone and that the signal lines per se are always served to transmit desired data, irrespective of the occurrence of the failure.

Since the wire data transmission system shown in FIG. 11 is substantially similar in basic arrangement as well as functions to those of the system shown in FIG.

9, like components are denoted by the same reference numerals to omit their explanations and only different points will be explained.

In the respective slave station in the wire data transmission system shown in FIG. 11, a threshold level comparison output from the comparator Q2 is applied to a short circuit detecting circuit DT, as seen in the drawing. If a failure occurs at least in a circuit element of the slave station in question, for example, the response switching transistor T2, connected between the terminals P3 and P4 of the signal lines, and the threshold level comparison output is maintained at a low level over a given duration of time, then the relay contact Xo is opened to interrupt the transistor T2 as a failure source from the signal line terminal P3.

Figure 12:
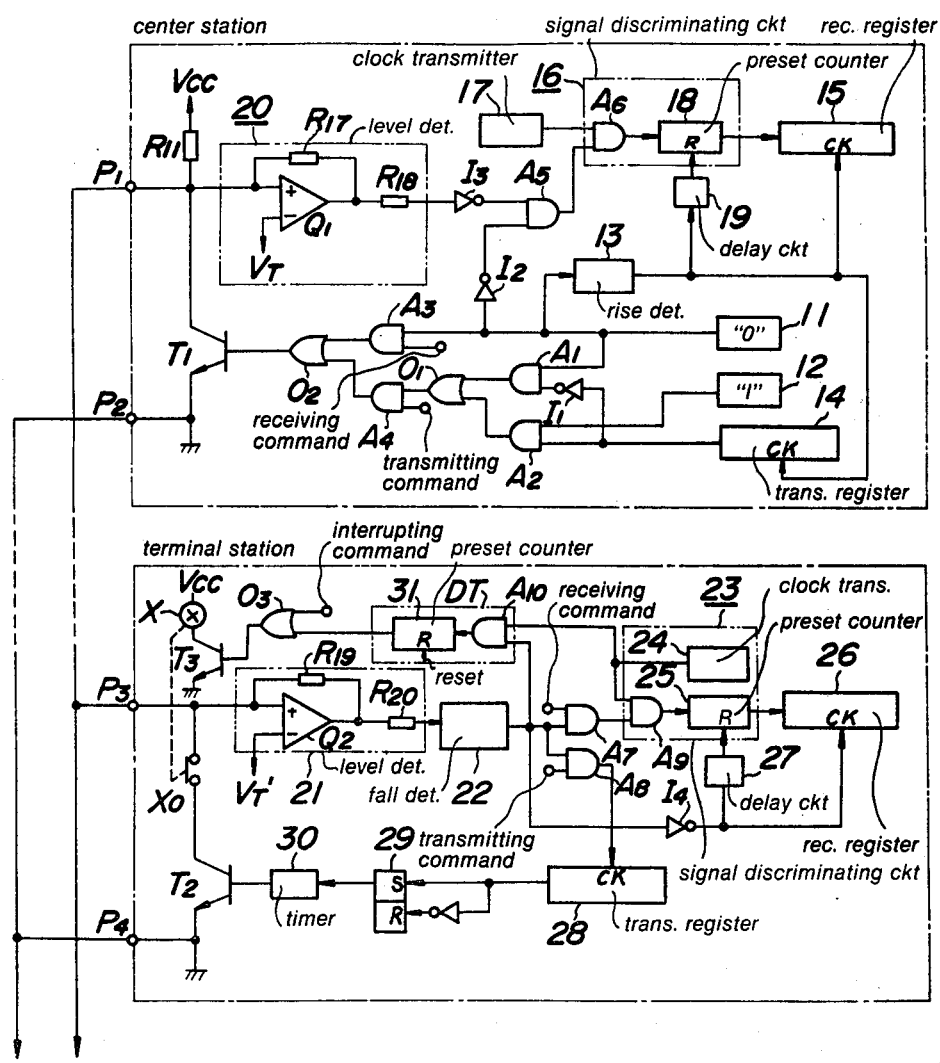
FIG. 12 is a block diagram showing an embodiment of a detailed construction of the transmission system of FIG. 11.

A detailed embodiment of a wire data transmission system having a basic arrangement as shown in FIG. 11 is shown in FIG. 12.

Since the wire data transmission system shown in FIG. 12 is substantially similar in arrangement and function to those of the wire data transmission system shown in FIG. 10, like components are denoted by the same reference numerals and no further explanation is given thereto. Only different points will be explained.

In the respective slave stations in the wire data transmission system shown in FIG. 12, a low level duration detecting output signal from the fall detecting circuit 22 is supplied to the short circuit detecting circuit DT. In the short circuit detecting circuit 22, the low level duration detecting output signal is applied to an AND gate A10, which allows clock pulse for counting time from the clock transmitter 24 to pass through the AND gate A10 only for a low level detecting duration, so that the clock pulses, the number of which corresponds to the time length of a low level detecting duration, are applied to the preset counter 31 which counts the number of the clock pulses. When the count exceeds a preset value which is longer than the time length of the low level duration having the voltage waveform as illustrated by the waveform D of FIG. 8 during the normal signal transmission time, it is deemed that the continuation of the low level detecting duration over a predetermined period is due to a short circuit failure between the signal lines, and then the counting output signal is applied through the OR gate O3 to the base of a relay operating transistor T3 to operate a relay X, thereby opening the relay contact Xo to interrupt the response switching transistor T2 in the slave station in question from the terminal T3 of the signal line. Consequently, in the case of the short circuit failure between the signal lines due to electrical breakdown of the response switching transistor T2 in that slave station, the response switching transistor T2 is kept interrupted from the terminal P3. In the case of the short circuit failure between the signal lines due to a fault occured in other slave station, the response switching transistor in that other slave station is interrupted from the signal lines in a similar manner, so that the short circuit between the terminals of the signal lines in the slave station in question is thus removed. As a result, the low level detecting output is not produced from the fall detecting circuit 22, and the relay contact Xo is closed, so that the slave station restores its normal operation state. Further, the interruption of such the switching transistor may be performed even by an interruption command.

Figure 13:
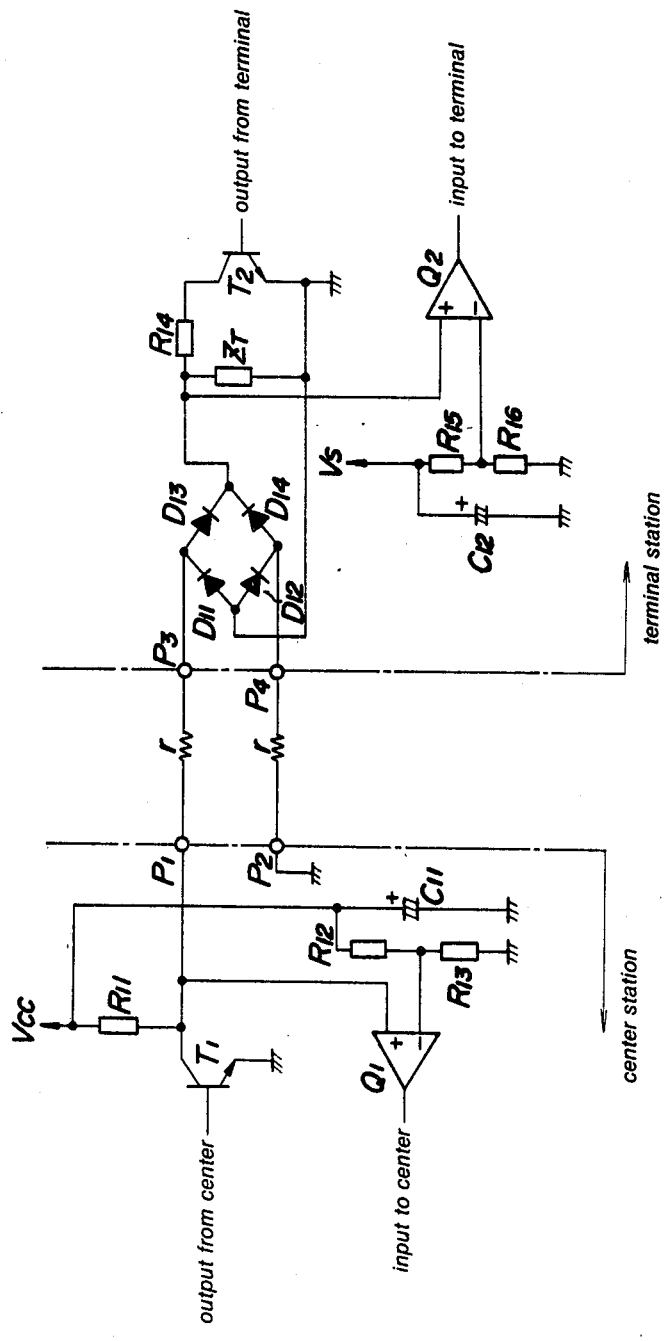
FIG. 13 is a circuit diagram showing a still further embodiment of a basic arrangement of a transmission system according to the present invention.

In FIG. 13, there is shown a basic arrangement of a further embodiment of an improved wire data transmission system for performing pulse width modulation type signal transmission, in which the wiring work is facilitated, without paying a special attention to the polarities of the pair of signal lines.

Since the wire data transmission system of FIG. 13 is substantially similar in basic arrangement as well as functions to those of the wire data transmission system of FIG. 9, like components are denoted by the identical reference numerals, and no further explanation will be given thereto. Only different points will be described hereinafter.

In the wire data transmission system having the basic arrangement shown in FIG. 13, a pulse train is applied to the pair of signal lines in the master station, and all the circuit equipments in the slave station are arranged so as to meet the polarity of the signal voltage applied to the signal lines. However, in order to lay out the pair of the signal lines over a long distance, for example, in walls of a hotel, a close attention must be paid to securely keep the polarities of the pair so as not to cause a signal line polarity problem. In the basic arrangement of FIG. 13, in order that a signal transmitted from the master station is received with a proper polarity so as to be fed to the circuit equipments in the slave station, irrespective of polarities of wired signal lines, a balancing bridge circuit consisting of diodes D11, D12, D13, and D14 is connected between the terminals P3 and P4 of the pair of the signal lines, so that a signal voltage having a proper polarity can be obtained from the balancing output terminals of the circuit, in spite of the polarities of the signal lines connected to the terminals P3 and P4.

An embodiment of a detailed arrangement of a wire data transmission system having a basic arrangement as described above is shown in FIG. 14.

Figure 14:
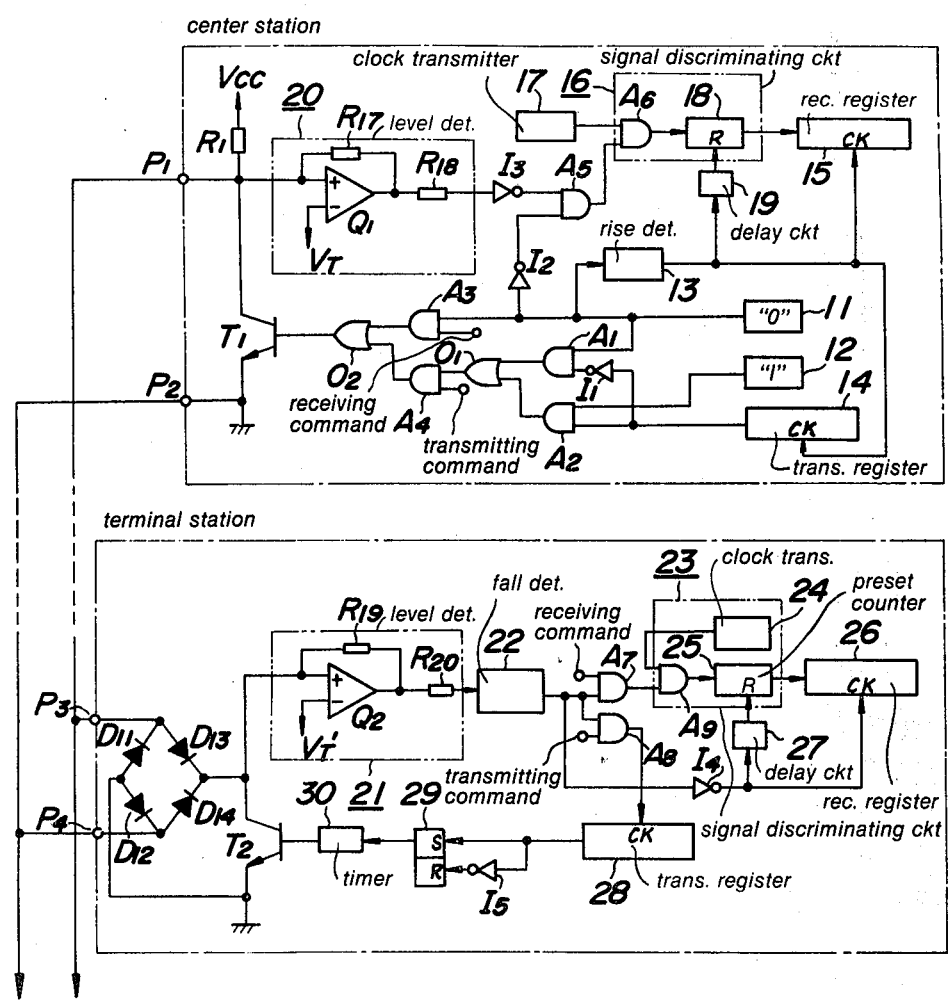
FIG. 14 is a block diagram showing an embodiment of a detailed construction of the transmission system of FIG. 13.

Since the wire data transmission system of FIG. 14 is substantially similar in arrangement and functions to those of the transmission system of FIG. 10, like components are denoted by the same reference numerals, and further explanations will be omitted. Only different points will be explained hereinafter.

In the slave station of the wire data transmission system of FIG. 14, a transmitting voltage waveform signal from the master station which appears between the terminals P3 and P4 of the pair of the signal lines are fed through the balancing bridge circuit consisting of diodes D11, D12, D13 and D14 to the level detecting circuit 21, while maintaining a proper polarity, irrespective of the polarities of the signal lines, as described with reference to FIG. 13.

Figure 15:
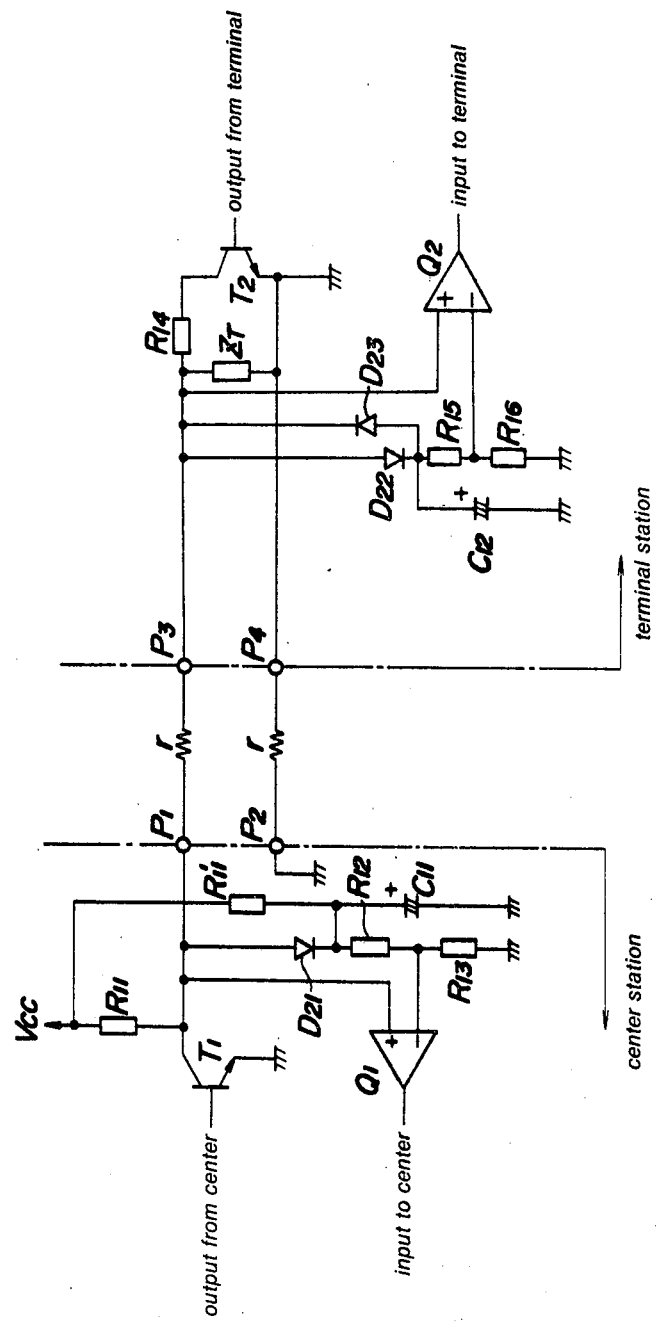
FIG. 15 is a circuit diagram, showing a still further embodiment of a basic arrangement of a transmission system according to the present invention.

There is shown in FIG. 15 a further embodiment of a basic arrangement of an improved wire data transmission system for use in the pulse modulation type signal transmission, wherein a selection of wire material for a signal line is easy and the wiring work and installation of a number of slave station equipments over a long distance are facilitated, without taking influences due to a line resistance into consideration.

Since the wire data transmission system having the basic arrangement shown in FIG. 15 is substantially similar in arrangement and functions to those of the system of FIG. 9, like components are denoted by the same reference numerals, and further explanations will be omitted. Only different points will be described hereinafter.

A detailed arrangement of the wire data transmission system having a basic arrangement shown in FIG. 15 is similar to the embodiment of the detailed arrangement shown in FIG. 10.

A level of a signal voltage from the master station which appears at the terminal P3 of the signal line in the respective slave stations of the wire data transmission system of FIG. 15 varies in accordance with a length of a signal line from the master station to a slave station and the number of the slave stations connected in parallel to the signal lines. For this reason, a reference voltage applied to the comparator Q2 for threshold level comparison of discriminating a high level from a low level in the received pulse train must be individually set and adjusted so as to meet a change of a voltage level of the received signal. In contrast with this, in the basic arrangement of FIG. 15, rectifying diodes D22 and D23 are connected to the terminal of the signal line to rectify the received pulse train per se. The voltage thus rectified is stabilized and smoothed by the capacitor C12, and then fed to a voltage divider consisting of resistors R15 and R16, so that the stabilized and smoothed voltage will be divided to a voltage of a proper level, for example, a voltage of an intermediate level, which is capable of clearly discriminating a high voltage level from a low voltage level in the pulse train from the master station, irrespective of a change in a voltage level in the pulse train, so that a reference voltage corrected automatically to a proper level is applied to the comparator Q2.

The reference voltage applied to the comparator Q1 for threshold level comparison for discriminating a "1" code signal from a "0" code signal in the received code signal pulse train is obtained by applying the power source voltage $V_{cc}$ through the resistor R11' to the capacitor C11 and by applying the voltage pulse train at the terminal P1 of the signal line through the diode D21 to the time constant circuit consisting of the capacitor C11 and the resistor voltage divider R12 and R13 to rectify and smooth the voltage pulse. By this arrangement, even if an extent of a reduction of level produced at a high level portion in the transmitted voltage pulse train as illustrated in the waveform D in FIG. 8 due to the short circuit between the signal lines in the slave station is varied according to the respective slave stations, due to differences of line resistances caused by difference of lengths of lines from the master station to the respective slave stations, the arrangement in this embodiment provides a properly rectified voltage which varies following such the change. If the voltage value of such the rectified voltage is set, for example, at a value of 65% of a high level portion in the voltage waveform D subject to the threshold level comparison, a sufficient allowance is obtained against the fluctuation in the upper or lower level of the waveform to be compared, and an accurate threshold level comparison is ensured.

INDUSTRIAL APPLICABILITY

As is clear from the above explanation, according to the present invention, the pair of the signal lines for data transmission are connected to the DC power source which is able to supply a current in the order of several ten milliamperes, so that the DC voltage is always supplied between the pair of the signal lines. The data from the master station is transmitted by encoding the data according to a time length of a short circuit between the signal lines. The data from the slave station is transmitted by encoding the data according to presence or absence of extension of time of short circuit between the signal lines, which short circuit is performed in the slave station in synchronism with the short circuit for clock transmission between the signal lines in the master station. The power source for energizing the signal controlling circuit in the slave station is supplemented by the supply of a signal line voltage through the diode. Thus, the present invention has the following advantageous effects.

(1) The signal line circuit has a low impedance, so that the noise durability is improved.

(2) The data transmission is performed by a kind of synchronous transmission and reception, without a provision of a circuit for synchronizing the slave stations with the transmitting station.

(3) In case of a power failure in the slave station, a power source voltage can be supplied to the slave station by the signal line voltage to ensure the data transmission.

(4) Since data code signals are transmitted by the ON or OFF of the output transistor, the transmission signal is not distorted due to noise or the like.

(5) Since the data transmission is performed by the ON or OFF of the transistor in the low resistance circuit, the data transmitting signal line circuit has a high response speed, so that data are transmitted at a high rate.

Further, a data transmission system according to the present invention is not only preferably applied to the case where a so-called hotel vending system is constructed in the form of wire system, but also to digital transmission of control signals in a remote supervisory control system. Under severe noise environments, such as in the case of outdoor wiring, it is preferable to add a surge suppressing means, since an over-current due to surge flows through the output transistor, when the output transistor becomes conductive at the time of data transmission.

In addition, according to the present invention, an occurrence of a short circuit failure between the signal lines in the data transmission system, in which data are encoded for transmission by short-circuiting the signal lines, is automatically processed in a manner that the signal lines are maintained in a state in which a short circuit failure between lines is temporarily removed, and then failure causes due to the terminal circuit elements in the respective slave stations are automatically checked up in a sequential fashion to detect the failure causes. As a result, a time period during which the functions of the whole of the data transmission system are interrupted due to the short circuit failure between lines is greatly shortened. Furthermore, even if a failure occurs in a slave station, an influence of the occurrence of the failure is limited only to the slave station in which the failure has occured, so that the signal lines are always available for the transmission of desired information, irrespective of occurrence of the failure.

Further, the self-checking means in a wire data transmission system according to the present invention may be applied in like manner to a data transmission system using one or more than one pair of signal lines, as well as to a data transmission system in which a data transmission method other than pulse width modulation is employed.

Furthermore, in a wire data transmission system according to the present invention, response information is transmitted only by changing a pulse waveform of a clock pulse train transmitted from the master station and consisting of the repetition of "0" signals or "1" signals, each of which consists of a predetermined mark signal and a predetermined space signal, without a provision of a transmitting circuit arrangement requiring a power, in the respective slave stations. Accordingly, if a wire data transmission system according to the present invention is applied, for example, to a hotel vendor system or the like, a number of slave stations can be easily installed and connected to common double line type signal lines. In addition, the slave stations are not influenced by the attenuation of transmitted information signals due to a resistance of the signal line.

In case that a wire data transmission system according to the present invention is applied, for example, to a hotel vendor system and that a number of slave stations are installed, the wiring work is easily performed without paying any special care to the polarities of the pair of the signal lines, so that a wire transmission system can be constructed inexpensively. The material of line to be used for the installation of the signal lines is easily selected. In addition, even if a number of slave stations are arranged over a long distance, the wiring work and the installation of the respective slave stations are easily performed without considering the influence of the line resistance. As a result, the data transmission system can be arranged with a low cost.

We claim:

1. A wire data collection system having a master station and a plurality of slave stations which are connected in common to said master station by a pair of signal lines, said wire data collection system comprising:

in said master station,
a power source for applying a DC voltage to one of said pair of signal lines via a resistor;
a first data transmission means for short-circuiting said pair of signal lines in accordance with a predetermined period in response to data from said master station to pulse-width encode said data from said master station by said short-circuiting so as to transmit an address signal designating one of said plurality of slave stations, and for subsequently transmitting a response clock pulse having said predetermined period to each of said plurality of slave stations; and
a first data reception means for detecting the change of a pulse width of a DC voltage on said one signal line when said response clock pulse is transmitted to receive data from the slave station designated by said address signal; and in each of said plurality of slave stations,
means for detecting a change of a pulse width of a DC voltage across said pair of signal lines to identify said address signal;
a second data transmission means for short-circuiting said pair of signal lines in synchronism with said response clock pulse when the slave station is designated by said address signal to encode said data from said slave station as a change of the pulse width of said response clock pulse so that said data from the designated slave station is transmitted to said master station.

2. A wire data collection system as claimed in claim 1, wherein each of said plurality of slave stations has means for deriving a DC voltage from said pair of signal lines through a diode as a power source voltage of the slave station.

3. A wire data collection system as claimed in claim 1, wherein a power source line is provided between said master station and each of said plurality of slave stations separately from said pair of signal lines, so that said power source in said master station is supplied to the slave station via said power source line.

4. A wire data collection system as claimed in claim 1, wherein the slave station is installed in a vending machine with doors and article sales data from said vending machine are transmitted as said data from said slave station to said master station.

5. A wire data collection system as claimed in claim 4, wherein said second data transmission means in said slave station and a data control arrangement in said vending machine with doors are coupled to each other in the form of a light signal, and said master station has a data processing unit for processing said article sales data as said data from the designated sleeve station.

6. A wire data collection system as claimed in claim 1, wherein each of said plurality of slave stations comprises switching means in series with circuit portions in said second data transmission means associated with a switching element for selectively short-circuiting said pair of signal lines, means for opening said switching means in all of said plurality of slave stations when said pair of signal lines are kept short-circuited over a predetermined time duration, and means for sequentially closing said switching means in all of said plurality of slave stations under the control of said master station to detect a short circuit failure between said signal lines in said circuit portions associated with said switching elements.

7. A wire data collection system as claimed in claim 6, wherein said switching means in all of said plurality of slave stations are closed after the lapse of a check-up period having a predetermined time duration after the occurrence of said short circuit failure between said signal lines.

8. A wire data collection system as claimed in claim 1, wherein said first data transmission means has means for continuously transmitting a clock pulse consisting of a periodically repeated pulse train having predetermined mark signals and predetermined space signals through said pair of signal lines to said slave station after the transmission of a calling pulse, so that one slave station is called from said master station to transmit data from the called slave station to said master station, said second transmission means has means for converting the mark signals or space signals in said clock pulse into space signals or mark signals, according to said data from the called slave station, and first data reception means has means for detecting the change of the mark signals or the space signals in said clock pulse to receive said data from said called slave station.

9. A wire data collection system as claimed in claim 8, wherein each of said plurality of slave stations comprises means for sensing the occurrence of a failure in the slave station and means for interrupting a connection between said signal lines in said slave station at the time of the occurrence of the failure.

10. A wire data collection system as claimed in claim 8, wherein each of said plurality of slave stations has a balancing bridge circuit for exchanging data between the slave station and said pair of signal lines, so that the signals including said response clock pulse and said data are supplied to said slave station with a fixed polarity, irrespective of the polarities of said pair of signal lines.

11. A wire data collection system as claimed in claim 8, wherein each of said plurality of slave stations comprises a reference level generating means for rectifying and smoothing said clock pulse received through said pair of signal lines to generate a reference level according to the rectified and smoothed output and a comparison means for comparing the level of said clock pulse received through said pair of signal lines with said reference level to identify a signal level.

* * * * *